(No Model.)

K. V. R. LANSINGH.
FILTER.

No. 496,614. Patented May 2, 1893.

Witnesses.
Thos. G. Sheridan.
Samuel E. Hibben

Inventor.
Killian V. R. Lansingh.
By Banning & Banning & Payson.
Attorneys.

UNITED STATES PATENT OFFICE.

KILLIAN V. R. LANSINGH, OF CHICAGO, ILLINOIS.

FILTER.

SPECIFICATION forming part of Letters Patent No. 496,614, dated May 2, 1893.

Application filed August 20, 1892. Serial No. 443,619. (No model.)

*To all whom it may concern:*

Be it known that I, KILLIAN V. R. LANSINGH, a citizen of the United States, residing at Chicago, Illinois, have invented certain new and useful Improvements in Filters, of which the following is a specification.

The object of my invention is to make a filter which shall not only be economical in construction and effective in use as a filter to free water from its impurities, but shall also be automatically cleansing, to remove the impurities that may accumulate upon or adhere to the filtering surface; and my invention consists of the features and combinations hereinafter described and claimed.

Figure 1:
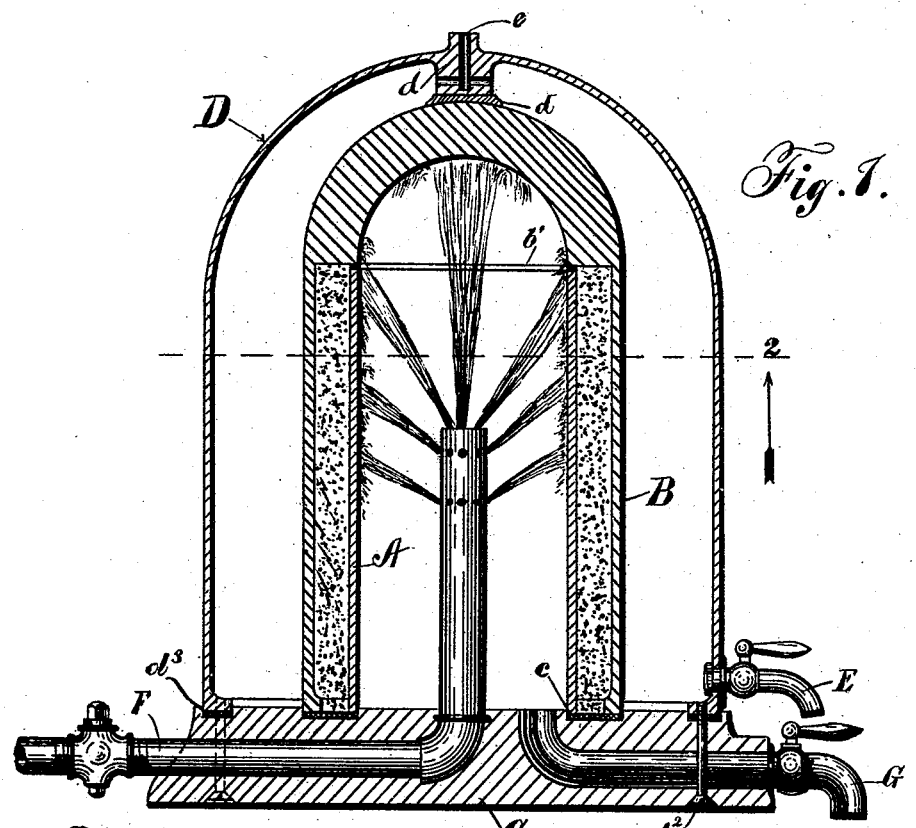
Figure 2:
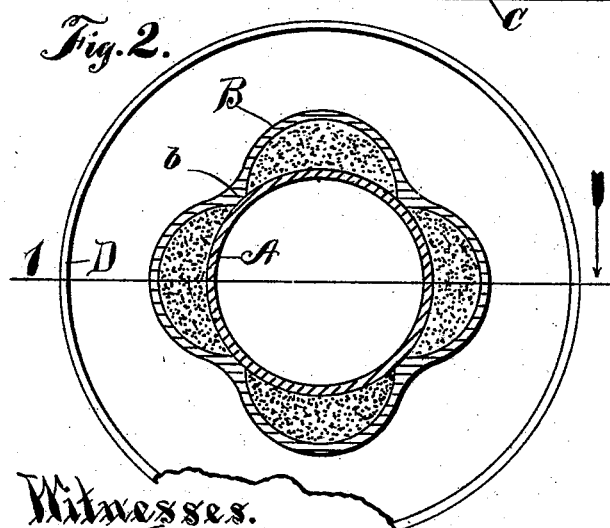
Figure 3:
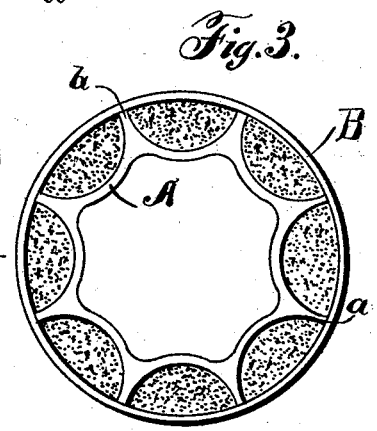

In the drawings, Figure 1 is a vertical section of my improved filter taken through the line 1 of Fig. 2, looking in the direction of the arrow. Fig. 2 is a transverse section taken through the line 2 of Fig. 1, looking in the direction of the arrow; and Fig. 3 is a plan view, as seen from the bottom, of a modified form of the filtering tube.

In making my improved filter, I make a filtering tube, A, of any suitable or desired kind of material that will make the same sufficiently porous to permit the water to percolate through and retain the impurities which it may contain. This filtering tube may be of any desired height or diameter and it admits of various modifications in its form. In Fig. 2, I have shown it as a plain cylinder, while in Fig. 3 I have shown it as presenting a corrugated surface on the inside, with serrations, a, extending out from its exterior surface. These serrations may be of any desired number or size, so long as they are capable of imparting to the filtering tube the requisite strength to withstand the internal pressure to which the tube will be subjected. I prefer also to make the filtering tube open both at the bottom and top, as shown in Fig. 1, and closed as hereinafter described, though I do not propose to confine myself in all cases to this particular form of construction. I also prefer to make an outer or supplementary cylinder B, adapted to surround and inclose the filtering tube proper. This outer cylinder may, if desired, be made with serrations, b, extending in from its interior surface, as shown in Fig. 2, so as to bear against the filtering tube at different points, and reinforce or strengthen it against pressure from the inside. Where, however, the filtering tube is made with external serrations, as shown in Fig. 3, the supplementary cylinder may be made of a plain circular form adapted to fit closely against the serrations of the filtering tube, so as to reinforce and strengthen it, and thus diminish the liability of breakage from internal pressure. I prefer, also, to make the supplementary cylinder with its upper portion sufficiently thickened to enable it to rest upon the upper end of the filtering tube, as shown in Fig. 1, so as to afford means for closing one end of the filtering tube and holding it securely in place. To make the joint thus formed between the filtering tube and the supplementary cylinder water tight, I prefer to place a rubber gasket or ring, b', between them. I also prefer to fill the space between the filtering tube and the supplementary cylinder with pulverized charcoal or other filtering material, so that after the water has percolated through the filtering tube so as to have all physical impurities removed, it will filter through the charcoal and be purified from odors or impurities that may not have been completely removed by the passage of the water through the porous filtering tube. This charcoal or other filtering material, however, may be used or not, as may be considered desirable in the practical application of the filter. I also prefer to make the supplementary cylinder of material more open or porous than the filtering tube proper, so that the water, after having passed through the filtering tube and through the pulverized charcoal, where the same is used, may flow or pass readily through the supplementary cylinder. I make a base, C, of iron or other desired or suitable material, on which the filter is intended to be mounted. In order to make the joint between the filter and the base water tight, I prefer to provide the base with an annular groove or channel, and arrange a rubber ring or gasket, c, in the same, so that the bottom of the filtering tube and of the supplementary cylinder will rest thereon, when in place for use.

In order to hold the filter securely upon its base, I inclose or surround it by an inverted cup-shaped cover D, which may be made of metal, glass or other suitable material. I prefer, however, to make it of glass or other transparent substance, so that a view of the filter may be presented through it. This cover is large enough to form an annular reservoir or chamber around the filter, in which the filtered water may accumulate to be drawn off for use. I prefer to provide this cover with a boss, $d$, resting upon preferably a rubber cushion, $d'$, arranged between it and the top of the supplementary cylinder B. The cover can be secured to the base by screws or bolts, $d^2$, and to make the joint or connection water tight its end may rest upon a rubber gasket or ring, $d^3$, arranged preferably in a groove or channel in the base. When the cover is drawn tightly into position on the base by the bolts or screws, its boss $d$ bearing upon the top of the supplementary cylinder, holds the same securely and tightly in position, so that neither it nor the filtering tube will become displaced or out of position in use. I provide a cock or faucet E, communicating with the filtered water chamber, so that filtered water may be drawn off for use from time to time, as desired, and to facilitate the flow of water from the filtered water chamber I provide a small hole or vent, $e$, preferably leading from the top of the cover through the base to admit air into the chamber. I also lead a pipe, F, from the water main or system through the base and into the interior of the filtering tube. I have represented this pipe as carried some distance up into the filtering tube, and as provided with small holes or orifices at and near its discharge end through which the water coming from the main or system under pressure may escape in fine streams or jets. This pipe, however, may be made open at the top and unprovided with the small separating holes or orifices, if preferred, and it may terminate at or near the bottom of the filtering tube, instead of being carried up into the same, as shown in the drawings, if desired. A cock or faucet, G, communicates through the base with the interior of the filtering tube, so that unfiltered water may be drawn off for ordinary purposes, as desired, as readily and conveniently as if no filter were used.

I prefer, in the construction of my filter, to make the discharge pipe and cock or faucet G of a size and capacity to carry off the water from the interior of the filtering tube more rapidly than it is supplied through the main or water system through the pipe F. By opening the faucet G, therefore, the water from the filtering tube can be drawn out so that the water coming in through the pipe F under pressure, may thoroughly wash and cleanse the interior of the filtering tube from the impurities that may have been separated from the water and accumulated on its interior surface. In this way, I am able without trouble or inconvenience of any kind to thoroughly wash and cleanse the filtering surface from time to time, as may be desired, and in fact to wash and cleanse it by the ordinary use of the unfiltered water for household or other purposes. By this construction it will be seen that the filtering tube is closed at the end opposite to that in which the water under pressure is introduced, and that the water is drawn off from or near the point where it is introduced, so that as it enters, it will be forced by the pressure from the main or system to the opposite end of the filtering tube and washed back through the same to the place where it is discharged, to effect a thorough washing and cleansing of the interior of the filtering tube throughout its whole extent.

What I regard as new, and desire to secure by Letters Patent, is—

In a filter, the combination of a filtering tube formed of porous stone, a supplementary cylinder formed of porous stone surrounding the tube and in contact therewith at several places in a longitudinal direction for strengthening the tube against internal pressure and forming a space for filtering material, an inclosing cover forming a filtered water chamber around the whole, a supply pipe introducing water into the interior of the filtering tube, a discharge pipe leading from the interior of the filtering tube, and a discharge faucet leading from the filtered water chamber, substantially as described.

KILLIAN V. R. LANSINGH.

Witnesses:
SAMUEL E. HIBBEN,
THOS. F. SHERIDAN.